(12) United States Patent
Asai et al.

(10) Patent No.: US 7,213,503 B2
(45) Date of Patent: May 8, 2007

(54) COMPRESSIBLE FLUID PRESSURE ACTUATOR

(75) Inventors: Katsuhiko Asai, Nara (JP); Yasunao Okazaki, Kusatsu (JP); Masaki Yamamoto, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 11/360,815

(22) Filed: Feb. 24, 2006

(65) Prior Publication Data

US 2006/0174761 A1    Aug. 10, 2006

Related U.S. Application Data

(63) Continuation of application No. PCT/JP2004/012182, filed on Aug. 25, 2004.

(30) Foreign Application Priority Data

Aug. 29, 2003  (JP) .............................. 2003-306450

(51) Int. Cl.
*F01B 19/04* (2006.01)
(52) U.S. Cl. ................. 92/92; 92/91; 901/22
(58) Field of Classification Search .............. 92/82, 92/90, 91, 92; 901/22
See application file for complete search history.

(56) References Cited

U.S. PATENT DOCUMENTS 4,995,304 A    2/1991  Daimler 5,165,323 A    11/1992  Sato
5,201,262 A    4/1993  Negishi et al.

FOREIGN PATENT DOCUMENTS

| DE | 19917481 | 10/2000 |
|---|---|---|
| DE | 19951603 | 8/2001 |
| JP | 51-143178 | 12/1976 |
| JP | 59-197605 | 11/1984 |
| JP | 60-048283 | 3/1985 |
| JP | 61-197806 | 9/1986 |
| JP | 61-233205 | 10/1986 |
| JP | 3-024304 | 2/1991 |
| JP | 4-145206 | 5/1992 |
| JP | 4-262908 | 9/1992 |
| JP | 5-48362 | 7/1993 |
| JP | 5-67397 | 9/1993 |
| JP | 6-159325 | 6/1994 |
| JP | 6-80321 | 10/1994 |
| JP | 9-76721 | 3/1997 |

*Primary Examiner*—Michael Leslie
(74) *Attorney, Agent, or Firm*—Wenderoth, Lind & Ponack, L.L.P.

(57) ABSTRACT

An inner space connected to a power source and an inner space connected by way of a pressure loss part with respect to the flow of compressible fluid are provided, thereby obtaining effects similar to when the volume occupied by the compressible fluid with respect to the entire inner space is reduced when the pressure of the pressure source is rapidly changed, and effects similar to when the entire inner space is one space when static load is applied from the outside.

9 Claims, 15 Drawing Sheets

COMPRESSIBLE FLUID PRESSURE ACTUATOR

This is a continuation application of International Application No. PCT/JP2004/012182, filed Aug. 25, 2004.

BACKGROUND OF THE INVENTION

The present invention relates to a compressible fluid pressure actuator.

A pneumatic actuator using compressible fluid has been proposed and put to practical use as one of the actuators suited to a field of domestic robots and the like where safety is important. The Mckibben pneumatic actuator shown in FIG. 9 is proposed as one example of the pneumatic actuator. The Mckibben pneumatic actuator has a configuration in which a restricting means 303a configured by a fiber cord is arranged on the exterior surface of a tube-like elastic body 302a made of a rubber material, where both ends of the tube-like elastic body 302a are sealed in an air tight manner with the inner side sealing parts 321a, 322a and the fixed means 331a, 331b. When inner pressure is provided to the inner space 305a of the tube-like elastic body 302a with compressible fluid such as air through a tube-like fluid injecting/extracting member 311a and the inner side sealing part 321a formed with a conduit, the tube-like elastic body 302a attempts to expand mainly in the radial direction but is changed to a motion in the central axis direction of the tube-like elastic body 302a due to the effect of the restricting means 303a, whereby the entire length contracts. The Mckibben actuator is a safe and light actuator having flexibility as the Mckibben actuator is mainly configured by an elastic body (e.g., refer to Japanese Unexamined Patent Publication No. 59-197605).

Increasing the generative force or the displacement of the pneumatic actuator is achieved by enlarging the pneumatic actuator, but in such case, the amount of consumption of the compressible fluid increases since the volume of the inner space increases, and thus the response of the pneumatic actuator lowers as an issue. A similar pneumatic actuator is also disclosed in Japanese Examined Patent Publication No. 5-67397, but has a similar issue in that the response of the pneumatic actuator lowers due to change in the volume of the inner space. In order to resolve such issues, the volume occupied by the compressible fluid in the inner space must be reduced. A pneumatic actuator shown in FIG. 10 is proposed as one example of such pneumatic actuator. This pneumatic actuator is a double structure of the pneumatic actuator shown in FIG. 9, where the tube-like elastic body 302b including the restricting means 303b is fixed to the inner side sealing parts 321b, 321c formed with a conduit by means of the fixing means 331c, 331d inside the tube-like elastic body 302a. The inner space is thus divided into two inner spaces 305b, 305c. The fluid is supplied from the outside to the inner space 305c of the tube-like elastic body 302b through the tube-like fluid injecting/extracting member 311b, and the inner side sealing part 321c formed with conduit. The response of the pneumatic actuator is enhanced since the volume occupied by the compressible fluid with respect to the entire inner space is reduced when a non-compressible fluid is supplied to one of the two inner spaces, (refer to e.g., Japanese Examined Patent Publication No. 6-80321, Japanese Examined Patent Publication No. 5-48362).

Although the pneumatic actuator of FIG. 10 described above enhances response by reducing the volume occupied by the compressible fluid with respect to the entire inner space, the flexibility, which is a characteristic of the pneumatic actuator, is lost as an issue.

Therefore, an object of the present invention is to provide, in view of the above, a compressible fluid pressure actuator that enhances response while maintaining flexibility.

SUMMARY OF THE INVENTION

The present invention is configured as below to accomplish the above object.

According to a first aspect of the present invention, there is provided a compressible fluid pressure actuator in which a pressure in a space defined inside is changed by a pressure of a compressible fluid supplied from a pressure source to generate displacement or force accordingly, the compressible fluid pressure actuator comprising:

a first tubular expandable member including a first inner space connected to the pressure source; and tubular members including one or more inner spaces connected to the first inner space by way of two or more pressure loss parts with respect to flow of the compressible fluid and each having a volume that does not depend on a pressure of a first inner space, wherein the tubular members include a first tubular member including a second inner space formed in the first tubular member and connected to the first inner space of the first tubular expandable member by way of the pressure loss part and having a volume that does not depend on the pressure of the first inner space; and a second tubular member arranged coaxially within the first tubular member including a third inner space and formed in the second tubular member and connected to the second inner space by way of another pressure loss part and having a volume that does not depend on a pressure of the second inner space.

According to a fourth aspect of the present invention, there is provided a compressible fluid pressure actuator in which a pressure in a space defined inside is changed by a pressure of a compressible fluid supplied from a pressure source to generate displacement or force accordingly, the compressible fluid pressure actuator comprising:

a first tubular expandable member including a first inner space connected to the pressure source; and tubular members including one or more inner spaces connected to the first inner space by way of two or more pressure loss parts with respect to flow of the compressible fluid and each having a volume that does not depend on a pressure of a first inner space, wherein the pressure loss parts are configured so that a pressure loss is always larger on the pressure loss part at a downstream side than the pressure loss part on an upstream side with respect to the pressure source when compared at the pressure loss for the same flow rate.

According to a fifth aspect of the present invention, there is provided a compressible fluid pressure actuator in which a pressure in a space defined inside is changed by a pressure of a compressible fluid supplied from a pressure source to generate displacement or force accordingly, the compressible fluid pressure actuator comprising:

a first tubular expandable member including a first inner space connected to the pressure source;

a second tubular expandable member including a second inner space connected to the pressure source by way of the first tubular expandable member and having a volume that does not depend on a pressure of the first inner space; and one or more pressure loss part with respect to flow of the compressible fluid, for connecting the first inner space and the second inner space, wherein the pressure loss part is configured so that a pressure loss at the pressure loss part changes according to a displacement of the compressible fluid pressure actuator.

According to a sixth aspect of the present invention, there is provided a robot configuring a robot arm using the compressible fluid pressure actuator as defined in any one of the first to fifth aspects.

According to a seventh aspect of the present invention, there is provided a compressible fluid pressure actuator in which a pressure in a space defined inside is changed by a pressure of a compressible fluid supplied from a pressure source to generate displacement or force accordingly, the compressible fluid pressure actuator comprising:

a first tubular expandable member including a first inner space connected to the pressure source;

a second tubular expandable member including a second inner space connected to the pressure source by way of the first tubular expandable member and having a volume that does not depend on a pressure of the first inner space; and two or more pressure loss parts with respect to flow of the compressible fluid, for connecting the first inner space and the second inner space, wherein the pressure loss parts are configured so that a pressure loss is always larger at the pressure loss part on a downstream side than the pressure loss part on an upstream side with respect to the pressure source when compared at the pressure loss for the same flow rate.

According to an eighth aspect of the present invention, there is provided a compressible fluid pressure actuator in which a pressure in a space defined inside is changed by a pressure of a compressible fluid supplied from a pressure source to generate displacement or force accordingly, the compressible fluid pressure actuator comprising:

a first tubular expandable member including a first inner space connected to the pressure source;

a second tubular expandable member including a second inner space connected to the pressure source by way of the first tubular expandable member and having a volume that does not depend on a pressure of the first inner space; and one or more pressure loss part with respect to flow of the compressible fluid, for connecting the first inner space and the second inner space, wherein an amount of pressure loss at the pressure loss part is adjustable from an outside.

According to a ninth aspect of the present invention, there is provided a compressible fluid pressure actuator in which a pressure in a space defined inside is changed by a pressure of a compressible fluid supplied from a pressure source to generate displacement or force accordingly, the compressible fluid pressure actuator comprising:

a first tubular expandable member including a first inner space connected to the pressure source; and a tubular member including an inner space connected to the first inner space by way of one pressure loss part with respect to flow of the compressible fluid and having a volume that does not depend on a pressure of the first inner space.

According to the present invention, a compressible fluid pressure actuator that can enhance response with respect to the movement at high acceleration where response is required, and that maintains flexibility with respect to the movement at low acceleration where safety is important can be obtained. That is, according to the present invention, by arranging an inner space connected to a pressure source and one or more inner spaces with respect to the flow of the compressible fluid connected by way of one or more pressure loss parts and being independent of the pressure of the first inner space (i.e., volume does not change by the pressure of the first inner space), the effects similar to when the volume occupied by the compressible fluid with respect to the entire inner space is reduced can be obtained even if the volume of the inner space is not actually changed when the pressure of the pressure source is rapidly changed, and the effects similar to when the entire inner space is one space can be obtained when static load is applied from the outside, whereby the compressible fluid pressure actuator in which the response is enhanced with respect to the movement at high acceleration where response is required, and in which the flexibility is maintained with respect to the movement at low acceleration where safety is important can be obtained.

More specifically, the pressure of the inner space connected thereto by way of the pressure loss part follows the pressure of the inner space connected to the pressure source with a delay since the compressible fluid flowing in the former inner space is small. Thus, when the pressure of the pressure source is rapidly changed, effects similar to when the volume occupied by the compressible fluid with respect to the entire inner space is reduced can be obtained since the influence of the inner space connected by way of the pressure loss part is reduced. When static load is applied from the outside, effects similar to when the entire inner space is one space can be obtained since the pressure gradually changes and thus the pressure of the inner space connected to the pressure source and the pressure connected thereto by way of the pressure loss part are substantially the same.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
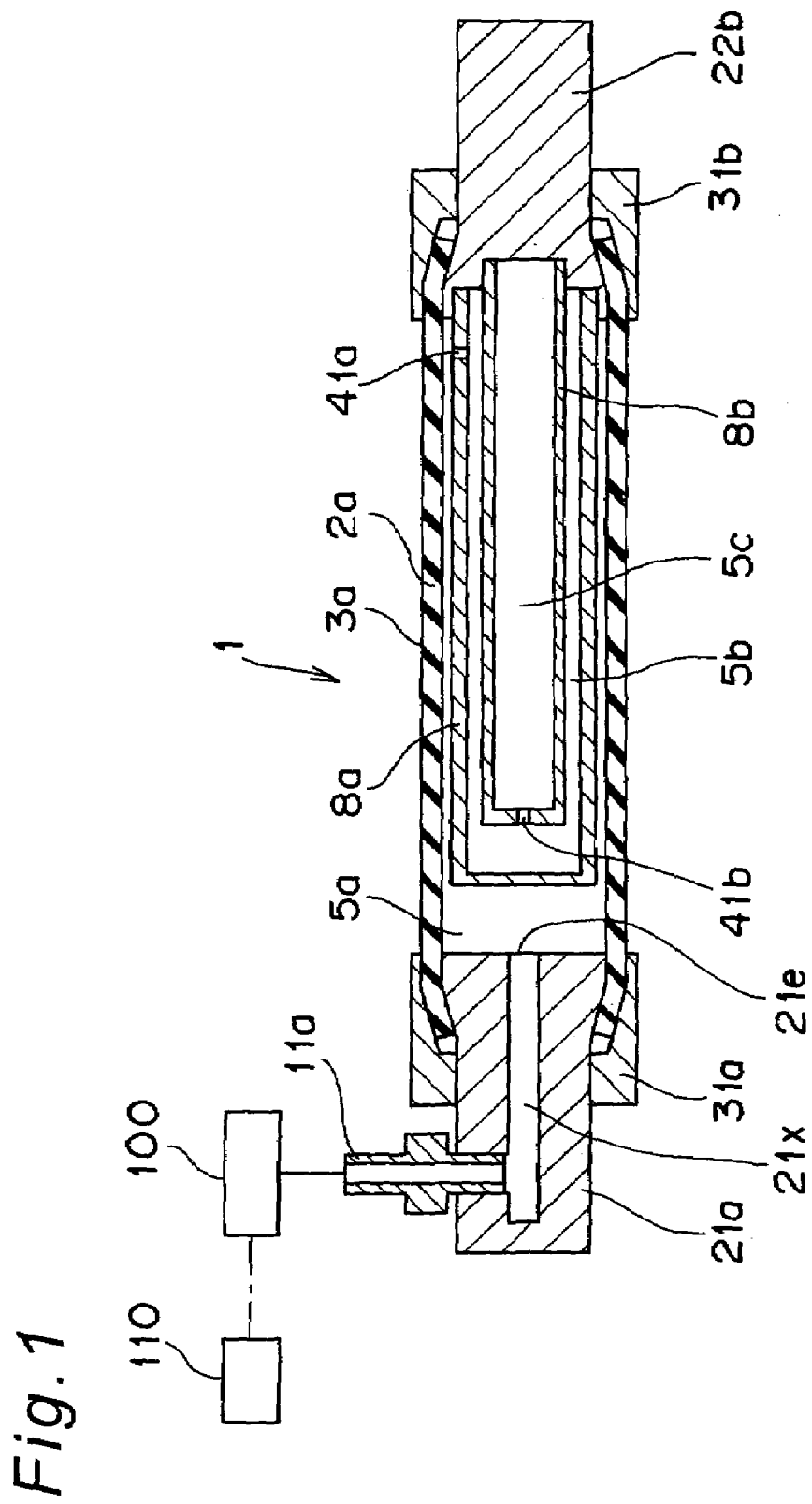
FIG. 1 is a cross sectional view showing an outline of a pneumatic actuator according to a first embodiment of the present invention.

Before the description of the present invention proceeds, it is to be noted that like parts are designated by like reference numerals throughout the accompanying drawings.

Various aspects of the present invention will first be explained before describing the embodiments of the present invention in detail based on the drawings.

According to a first aspect of the present invention, there is provided a compressible fluid pressure actuator in which a pressure in a space defined inside is changed by a pressure of a compressible fluid supplied from a pressure source to generate displacement or force accordingly, the compressible fluid pressure actuator comprising:

a first tubular expandable member including a first inner space connected to the pressure source; and tubular members including one or more inner spaces connected to the first inner space by way of two or more pressure loss parts with respect to flow of the compressible fluid and each having a volume that does not depend on a pressure of a first inner space, wherein the tubular members include a first tubular member including a second inner space formed in the first tubular member and connected to the first inner space of the first tubular expandable member by way of the pressure loss part and having a volume that does not depend on the pressure of the first inner space; and a second tubular member arranged coaxially within the first tubular member including a third inner space and formed in the second tubular member and connected to the second inner space by way of another pressure loss part and having a volume that does not depend on a pressure of the second inner space.

According to a second aspect of the present invention, there is provided the compressible fluid pressure actuator as defined in the first aspect, wherein the pressure loss part is a fine pore for connecting the inner spaces.

According to such configuration, since the pressure of the inner space connected to, by way of the pressure loss part, the inner space connected to the pressure source and being independent of the pressure of the inner space connected to the pressure source (i.e., volume does not change by the pressure of the inner space connected to the pressure source) follows the pressure of the inner space connected to the pressure source with a delay since the compressible fluid flowing in the inner space connected by way of the pressure loss part is small, when the pressure of the pressure source is rapidly changed, effects similar to when the volume occupied by the compressible fluid with respect to the entire inner space is reduced can be obtained even if the volume of the inner space is not actually changed since the influence of the inner space connected by way of the pressure loss part is small. When static load is applied from the outside, the effects similar to when the entire inner space is one space can be obtained since the pressure of the inner space connected to the pressure source and the pressure of the inner space connected thereto by way of the pressure loss part becomes substantially equal as the pressure gradually changes. The compressible fluid pressure actuator that can enhance response with respect to the movement at high acceleration where response is required and that can maintain flexibility with respect to the movement at low acceleration where safety is important can be obtained.

According to a third aspect of the present invention, there is provided a compressible fluid pressure actuator in which the compressible fluid pressure actuator as defined in the first aspect is provided in a plural quantity to be connected by connecting the inner spaces of the adjacent actuators by way of the one or more pressure loss part with respect to the flow of the compressible fluid.

According to such configuration, the pressure in the third inner space follows the pressure of the first inner space with more delay than the pressure of the second inner space, and thus the compressible fluid pressure actuator in which the balance between the response and the flexibility with respect to the movement at intermediate acceleration is more finely set can be obtained.

According to a fourth aspect of the present invention, there is provided a compressible fluid pressure actuator in which a pressure in a space defined inside is changed by a pressure of a compressible fluid supplied from a pressure source to generate displacement or force accordingly, the compressible fluid pressure actuator comprising:

a first tubular expandable member including a first inner space connected to the pressure source; and tubular members including one or more inner spaces connected to the first inner space by way of two or more pressure loss parts with respect to flow of the compressible fluid and each having a volume that does not depend on a pressure of a first inner space, wherein the pressure loss parts are configured so that a pressure loss is always larger on the pressure loss part at a downstream side than the pressure loss part on an upstream side with respect to the pressure source when compared at the pressure loss for the same flow rate.

According to a fifth aspect of the present invention, there is provided a compressible fluid pressure actuator in which a pressure in a space defined inside is changed by a pressure of a compressible fluid supplied from a pressure source to generate displacement or force accordingly, the compressible fluid pressure actuator comprising:

a first tubular expandable member including a first inner space connected to the pressure source;

a second tubular expandable member including a second inner space connected to the pressure source by way of the first tubular expandable member and having a volume that does not depend on a pressure of the first inner space; and one or more pressure loss part with respect to flow of the compressible fluid, for connecting the first inner space and the second inner space, wherein the pressure loss part is configured so that a pressure loss at the pressure loss part changes according to a displacement of the compressible fluid pressure actuator.

According to a sixth aspect of the present invention, there is provided a robot configuring a robot arm using the compressible fluid pressure actuator as defined in any one of the first to fifth aspects.

According to a seventh aspect of the present invention, there is provided a compressible fluid pressure actuator in which a pressure in a space defined inside is changed by a pressure of a compressible fluid supplied from a pressure source to generate displacement or force accordingly, the compressible fluid pressure actuator comprising:

a first tubular expandable member including a first inner space connected to the pressure source;

a second tubular expandable member including a second inner space connected to the pressure source by way of the first tubular expandable member and having a volume that does not depend on a pressure of the first inner space; and two or more pressure loss parts with respect to flow of the compressible fluid, for connecting the first inner space and the second inner space, wherein the pressure loss parts are configured so that a pressure loss is always larger at the pressure loss part on a downstream side than the pressure loss part on an upstream side with respect to the pressure source when compared at the pressure loss for the same flow rate.

According to an eighth aspect of the present invention, there is provided a compressible fluid pressure actuator in which a pressure in a space defined inside is changed by a pressure of a compressible fluid supplied from a pressure source to generate displacement or force accordingly, the compressible fluid pressure actuator comprising:

a first tubular expandable member including a first inner space connected to the pressure source;

a second tubular expandable member including a second inner space connected to the pressure source by way of the first tubular expandable member and having a volume that does not depend on a pressure of the first inner space; and one or more pressure loss part with respect to flow of the compressible fluid, for connecting the first inner space and the second inner space, wherein an amount of pressure loss at the pressure loss part is adjustable from an outside.

According to a ninth aspect of the present invention, there is provided a compressible fluid pressure actuator in which a pressure in a space defined inside is changed by a pressure of a compressible fluid supplied from a pressure source to generate displacement or force accordingly, the compressible fluid pressure actuator comprising:

a first tubular expandable member including a first inner space connected to the pressure source; and a tubular member including an inner space connected to the first inner space by way of one pressure loss part with respect to flow of the compressible fluid and having a volume that does not depend on a pressure of the first inner space.

According to such configuration, the compressible fluid pressure actuator that can enhance response by reducing the displacement with respect to the movement at high acceleration and that can enhance flexibility by increasing the displacement with respect to the movement at low acceleration can be obtained.

According to such configuration, the pressure of the compressible fluid pressure actuator connected by way of the pressure loss part follows the internal pressure of the compressible fluid pressure actuator connected to the pressure source with a delay since the compressible fluid flowing in the former actuator is small, and thus the effect of the compressible fluid pressure actuator connected to the latter actuator by way of the pressure loss part is reduced when the pressure of the pressure source is rapidly changed, and effects similar to when the length of the compressible fluid pressure actuator is shortened and the volume of the inner space is reduced can be obtained even if the volume of the inner space is not actually changed. Thus, the compressible fluid pressure actuator that exhibits the property similar to the compressible fluid pressure actuator in which the displacement with respect to the movement at high acceleration is small while excelling in response and similar to the compressible fluid pressure actuator in which the displacement with respect to the movement at low acceleration is large while excelling in flexibility can be obtained.

According to such configuration, the compressible fluid pressure actuator that can increase time delay of the pressure change even in the inner space on the downstream side where the change in flow rate is reduced compared to the inner space on the upstream side due to connection to the pressure source by way of a plurality of the pressure loss parts, and that can change response and flexibility stepwise between the movement at high acceleration and the movement at low acceleration can be obtained.

According to such configuration, the time response property of the pressure of the compressible fluid pressure actuator involved in the change in the pressure loss by the pressure loss part according to the displacement of the actuator is also adjustable.

According to such configuration, the time response property of the displacement of the compressible fluid pressure actuator involved in the change in the pressure loss by the pressure loss part according to the pressure of the actuator is also adjustable.

According to such configuration, the compressible fluid pressure actuator in which flexibility is more enhanced with respect to the movement at low acceleration can be obtained.

According to such configuration, the compressible fluid pressure actuator in which the balance between the response and the flexibility is adjustable, and the robot having the robot arm configured by the compressible fluid pressure actuator can be obtained.

Various embodiments of the present invention will now be described in detail based on the drawings.

(First Embodiment)

FIG. 1 is a cross sectional view showing an outline of a pneumatic actuator 1 serving as one example of a compressible fluid pressure actuator according to a first embodiment of the present invention. In FIG. 1, reference numeral 2a is a first tube-like elastic body, which includes a space inside and is made of rubber or rubber-like elastic body, functioning as one example of a first tubular expandable member. Reference numeral 3a is a deforming direction regulating member, in which resin or metal fiber code that is not easily stretched in terms of material is woven in a mesh shape so that the deformation in the radial direction due to the expansion of the first tube-like elastic body 2a is converted to the contraction of the length in the axial direction and so that the deformation in the radial direction due to the contraction of the first tube-like elastic body 2a is converted to the expansion of the length in the axial direction, and is arranged so as to cover the exterior surface of the first tube-like elastic body 2a. Reference numerals 21a, 22b are inner side sealing parts, functioning as one example of a sealing means of a rigid body such as metal or hard plastic, for sealing one end of the first tube-like elastic body 2a, and which performs sealing by sandwiching both ends of the first tube-like elastic body 2a between the outer side sealing parts 31a and 31b functioning as one example of a fixing means. That is, one end of the first tube-like elastic body 2a is sandwiched and sealed with the inner side sealing part 21a formed with a fluid flow path 21x in the inside and the outer side sealing part 31a that performs sealing in cooperation with the inner side sealing part 21a, and the other end of the first tube-like elastic body 2a is sandwiched and sealed with the inner side sealing part 22b without the fluid flow path in the inside and the outer side sealing part 31b that performs sealing in cooperation with the inner side sealing part 22b. Reference numeral 11a is a tube-like fluid injecting/extracting member, and is arranged in the inner side sealing part 21a so that the conduit therein communicates with the flow path 21x of the inner side sealing part 21a. The tube-like fluid injecting/extracting member 11a is connected to an external pressure source 100 such as a compressor by way of a predetermined conduit under a control of a controlling device 110 capable of controlling the pressure of the external pressure source 100, and the compressible fluid flows between the external pressure source 100 and the inner space of the first tube-like elastic body 2a through the tube-like fluid injecting/extracting member 11a and the inner side sealing part 21a including the conduit. Air or inactive gas such as helium may be used as the compressible fluid. Air is particularly desirable since air is easy to supply. The first and second cylindrical covers 8a, 8b each functioning as one example of a first tubular member and a second tubular member serving as one example of the tubular members are arranged inside the first tube-like elastic body 2a, the cylindrical covers being coaxially arranged and preferably formed as a rigid body having a rigidity to an extent that the rigid body does not expand by the compressible fluid such as air and does not volume change by the outside pressure, and including an opening on each fixed end side and a bottom on each free end side. Each fixed end of the first and second cylindrical covers 8a, 8b is fitted into and fixed to the inner side sealing part 22b. The inside of the first tube-like elastic body 2a is divided into first, second, and third inner spaces 5a, 5b, 5c by the first and second cylindrical covers 8a, 8b. That is, the first inner space 5a of cylindrical shape is formed between the first tube-like elastic body 2a and the first cylindrical cover 8a, the second inner space 5b of cylindrical shape is formed between the first cylindrical cover 8a and the second cylindrical cover 8b, and the third inner space 5c is formed in the second cylindrical cover 8b.

The first and second inner spaces 5a and 5b, and the second and third inner spaces 5b and 5c are connected by the pressure loss parts 41a, 41b, respectively, with respect to the respective flow. The pressure loss part may be fine pores 41a, 41b, and the like. The fine pores 41a and 41b are desirable in terms of easy processing. The first fine pore 41a is a fine pore passed through and formed at the side surface in the vicinity of the fixed end side of the first cover 8a, and is preferably arranged at a position as far away as possible from the opening 21e of the passage 21x of the inner side sealing part 21a to exhibit the pressure loss function. Further, the second fine pore 41b is a fine pore passed through and formed at substantially the middle of the end face on the free end side of the second cover 8b, and is preferably arranged at a position as far away as possible from the first fine pore 41a of the first cover 8a to exhibit the pressure loss function. Further, the inner diameter of each fine pore 41a, 41b is substantially the same and is smaller than the inner diameter of the flow path 21x.

As one example of the fine pore, for instance, the fine pore is appropriately selected within a range of less than or equal to about the maximum inner diameter 1 mm so as to function as the pressure loss part and a smallest inner diameter of an extent dust in the air to be used is not caught at the fine pore. Specifically, the inner diameter is about 0.1 to 2 mm, and more preferably, about 0.5 to 1 mm. The size of the inner diameter changes due to the length of the elastic body or the first and second cylindrical covers, and the cleanliness of the air. As a specific example, when the entire length of the deforming direction regulating member 3a is between 30 and 40 cm, and the outer diameter is between 30 and 40 mm, the inner diameter of the fine pore is preferably about 0.1 to 2 mm.

Figure 11:
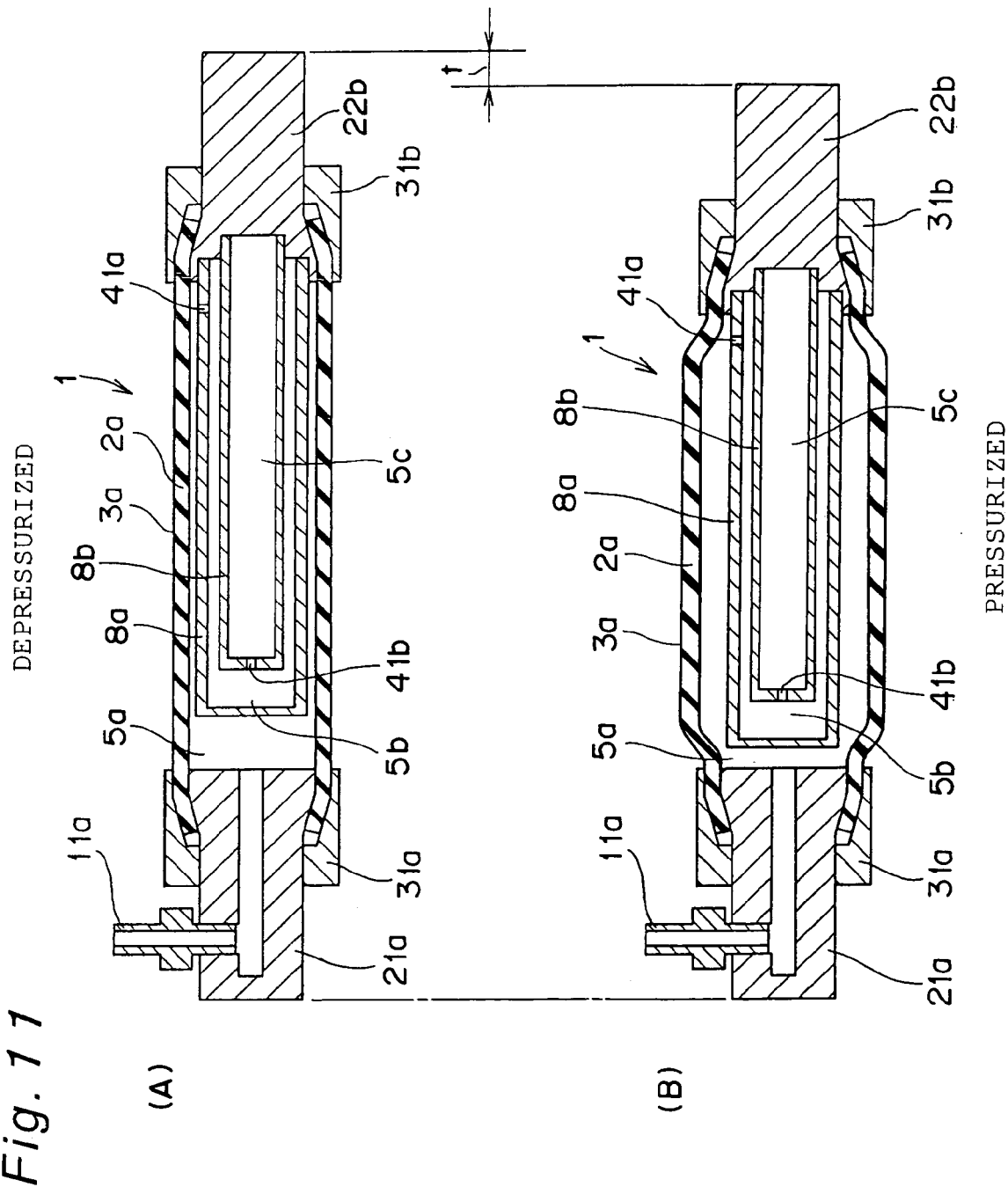
FIG. 11 is a schematic cross sectional view including views indicated by (A) and (B) showing the operation in a depressurized state and the operation in a pressurized state, respectively, of the pneumatic actuator.

The operation of the pneumatic actuator 1 will now be explained. The pneumatic actuator 1 generates displacement or force according to the inner pressure. Compared to the depressurized state shown indicated by (A) in FIG. 11, when the external force is not applied, the first tube-like elastic body 2a expands in the radial direction in the pressurized state shown indicated by (B) in FIG. 11, and the pneumatic actuator 1 contracts by dimension t in the length direction. The inner pressure is determined by the amount of compressible fluid stored inside the pneumatic actuator 1. Since the amount of compressible fluid flowing from the tube-like fluid injecting/extracting member 11a to the pneumatic actuator 1 is determined by the difference between the pressure on the supply side (external pressure source 100 side) of the compressible fluid and the inner pressure of the pneumatic actuator 1, the inner pressure of the pneumatic actuator 1 shows a response close to a primary delay system with respect to the pressure on the supply side of the compressible fluid. If the pressure loss parts 41a, 41b with respect to the flow of the compressible fluid are provided between the supply side of the compressible fluid and the pneumatic actuator 1 (more specifically, between the first inner space 5a and the second inner space 5b, and between the second inner space 5b and the third inner space 5c), the pressure loss increases compared to when the pressure loss parts 41a, 41b are not provided, and thus the flow rate of the compressible fluid at the same pressure difference decreases. Thus, the time necessary for the inner pressure of the pneumatic actuator 1 to become equal to the pressure on the supply side of the compressible fluid becomes long. This means that the time constant in the primary delay system becomes large. In the pneumatic actuator 1 according to the first embodiment of the present invention, the pressure of the second inner space 5b changes with a delay with respect to the pressure of the first inner space 5a, and similarly, the pressure of the third inner space 5c changes with a delay with respect to the pressure of the second inner space 5b when the pressure of the external pressure source 100 is changed by the controlling device 110.

Assume the time constant of the pressure response of the first inner space 5a with respect to the pressure of the external pressure source 100 is $T_1$, the time constant of the pressure response of the second inner space 5b with respect to the pressure of the first inner space 5a is $T_2$, and the time constant of the pressure response of the third inner space 5c with respect to the pressure of the second inner space 5b is $T_3$. It is to be noted that the influence in the other inner spaces is not taken into account. When the pressure loss parts 41a, 41b are arranged so that $T_1 \ll T_2 < T_3$, the pressure of the second and the third inner spaces 5b, 5b barely change even if the pressure of the first inner space 5a becomes close to the pressure of the external pressure source 100 when the pressure of the external pressure source 100 is rapidly changed by the controlling device 110. In this case, the property of the pneumatic actuator 1 becomes substantially the same as when only the first inner space 5a is provided. Since this state is the same as when the volume occupied by the compressible fluid with respect to the entire inner space is decreased, it excels in response in comparison with the conventional example. The time constant is desirably increased towards the downstream when seen from the external pressure source 100 to exhibit the effects of the pressure loss parts 41a, 41b. To this end, the pressure loss of when compared at the same flow rate must increase towards the downstream. Specifically, as one example, the inner diameter of the fine pore 41b is made smaller than that of the fine pore 41a, so that the pressure loss of when compared at the same flow rate increases towards the downstream.

Further, when the pressure of the external pressure source 100 is gradually changed or when static load is applied from the outside or the like, the flow rate of the compressible fluid passing through the pressure loss parts 41a, 41b is small, and thus the influence of the pressure loss parts 41a, 41b is reduced, whereby the property substantially the same as when the first to the third inner spaces 5a, 5b, 5b are one inner space is exhibited, and the flexibility similar to the conventional example is obtained. Further, when the pressure of the external pressure source 100 is changed by the controlling device 110 over an appropriate time, the property substantially the same as when only the first and the second inner spaces 5a, 5b are provided is exhibited, and thus flexibility and response at an intermediate movement can be set.

According to the first embodiment, as mentioned above, by arranging the first inner space 5a connected to the external pressure source 100 and one or more second and third inner spaces 5b, 5c connected to the first inner space 5a by way of one or more pressure loss parts 41a, 41b with respect to the flow of the compressible fluid and being independent of the pressure of the first inner space 5a (i.e., volume does not change by the pressure of the first inner space 5a), the effects similar to when the volume occupied by the compressible fluid with respect to the entire inner space is reduced are obtained even if the volume of the inner space is not actually changed when the pressure of the external pressure source 100 is rapidly changed, and the effects similar to when the entire inner space is one space are obtained when static load is applied from the outside, whereby the pneumatic actuator 1 in which the response can be enhanced with respect to the movement at high acceleration where response is required, and in which the flexibility can be maintained with respect to the movement at low acceleration where safety is important can be obtained.

Figure 9:
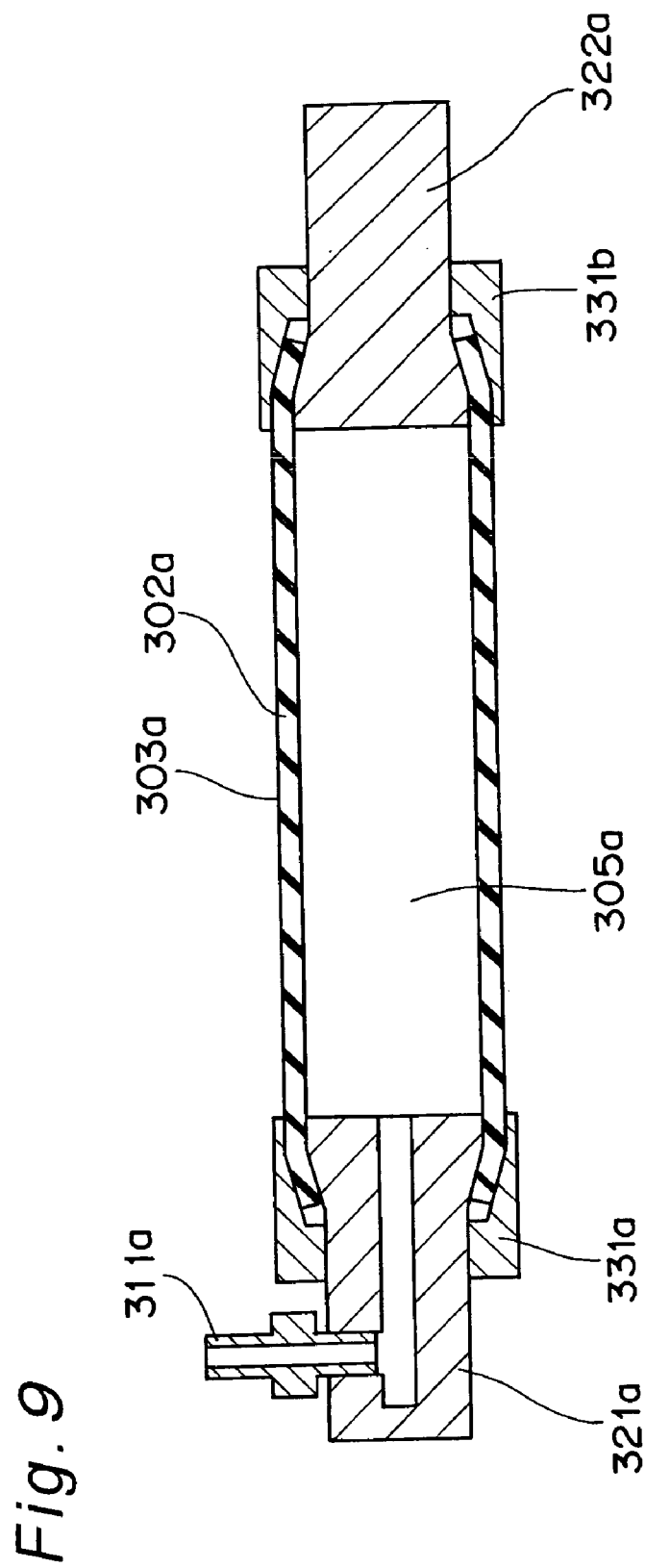
FIG. 9 is a cross sectional view showing an outline of a pneumatic actuator of a conventional configuration.
Figure 10:
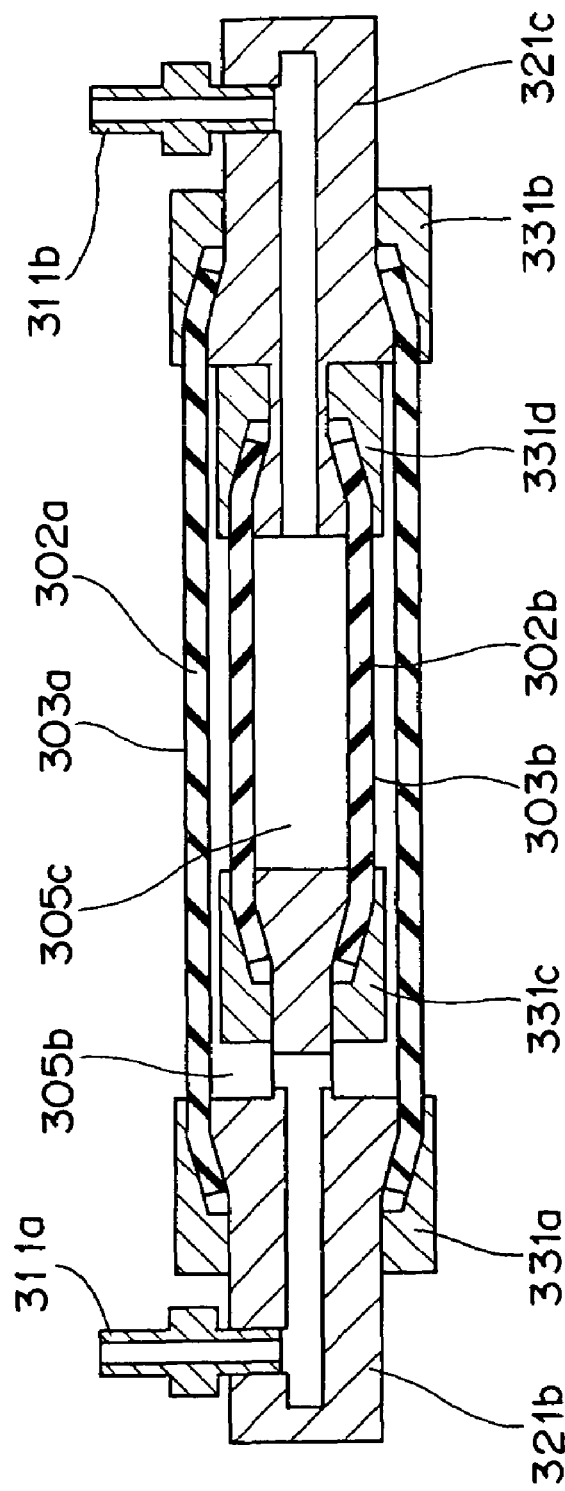
FIG. 10 is a cross sectional view showing an outline of a pneumatic actuator of a conventional configuration.
Figure 12:
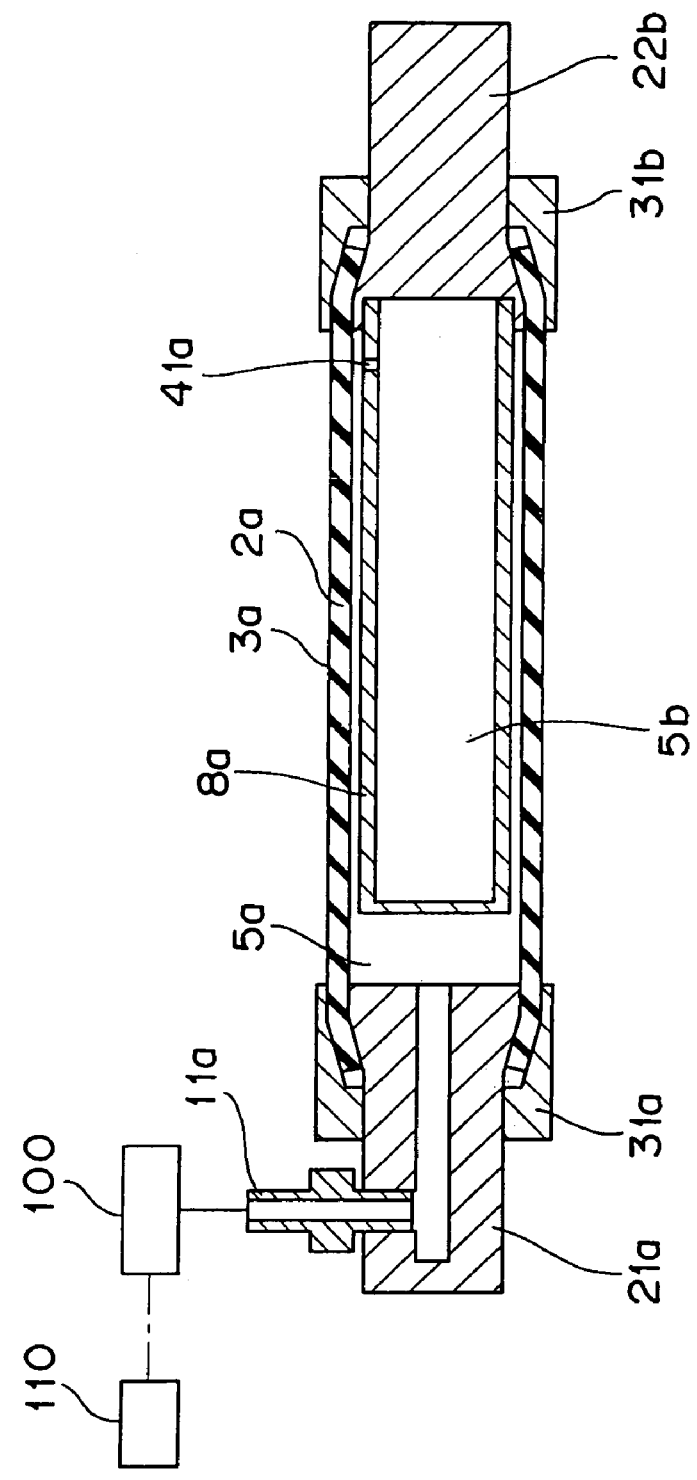
FIG. 12 is a schematic cross sectional view showing another configuration example in the pneumatic actuator according to the first embodiment of the present invention.
Figure 13A:
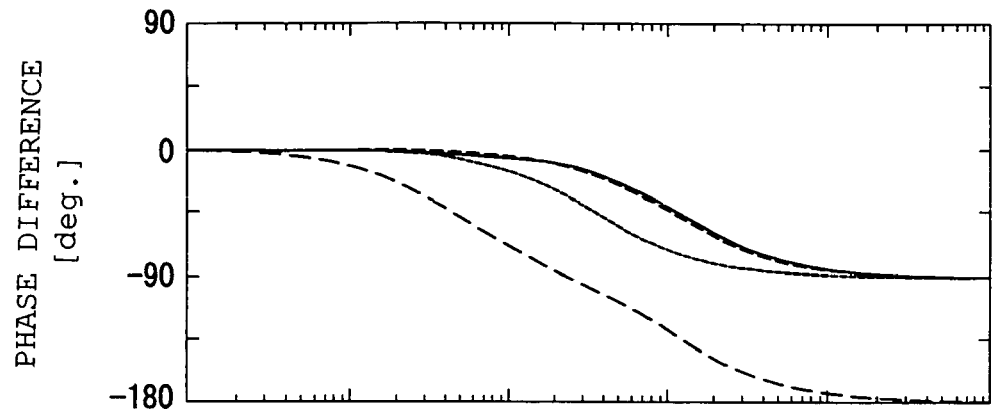
FIGS. 13A and 13B are graphs showing a frequency response of the pressure in the pneumatic actuator according to the first embodiment of the present invention.
Figure 13B:
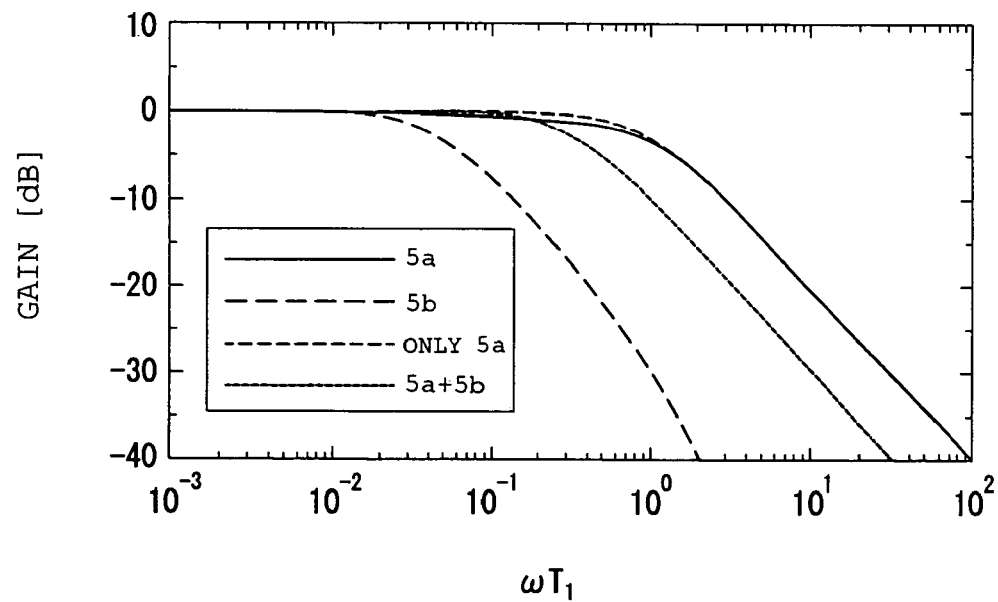
Figure 14:
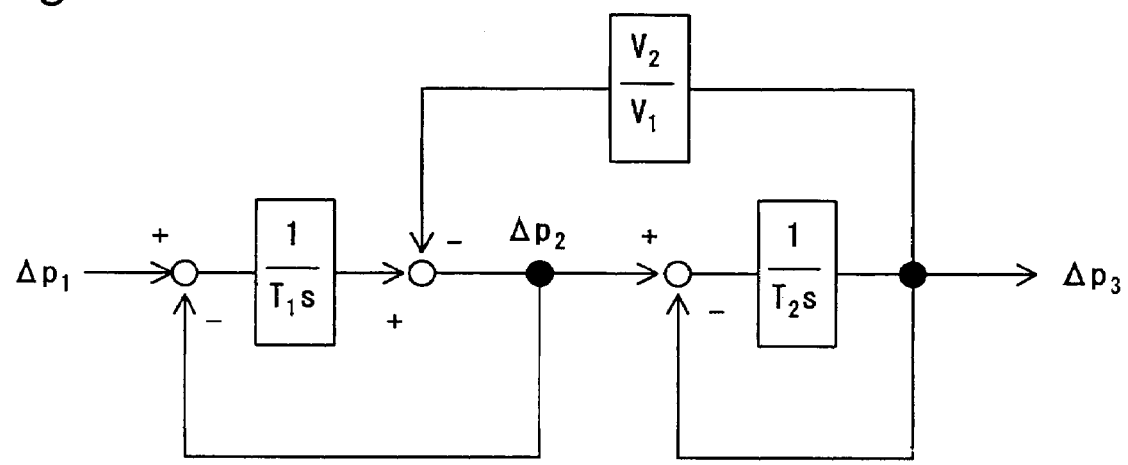
FIG. 14 is a block diagram explaining the relationship of the pressure in the pneumatic actuator according to the first embodiment of the present invention.

The case of dividing the inner space into three sections is explained in the first embodiment, but is not limited to dividing into three sections and similar effects are exhibited as long as it is divided into two or more sections. As one example, FIG. 12 shows a cross sectional view of when the second cylindrical cover 8b in FIG. 1 is omitted and the inner space is divided into two sections. The example of the calculation of the frequency response of the inner pressure of the actuator 1 with respect to the pressure of the external pressure source 100 is shown in FIGS. 13A and 13B in such configuration. FIG. 13A is a calculation result of the phase difference, and FIG. 13B is the calculation result of the gain. Further, the frequency on the abscissa axis is shown by the product $\omega T_1$ of the angular frequency $\omega$ that changes the pressure of the external pressure source 100 and the time constant $T_1$. In this figure, the response shown with a fine dotted line of "only 5a" is a response of when the pressure loss part 41a is not provided and thus the compressible fluid does not enter and exit with respect to the second inner space 5b, and is the response of the actuator that is superior in response but inferior in flexibility. Further, the response shown with the finest dotted line "5a+5b" is a response of when the first cylindrical cover 8a that partitions the first inner space 5a and the second inner space 5b is not provided as in the conventional example shown in FIG. 9, and is the response of the actuator that is superior in flexibility but inferior in response. The response shown with a solid line of "5a" and the response shown with a dotted line of "5b" each shows the response of the pressure of the first inner space 5a and the second inner space 5b, respectively, in the embodiment of FIG. 12. This calculation is performed under the condition that the time constant $T_2$ of the pressure response of the second inner space 5b with respect to the pressure of the first inner space 5a is 20 times the time constant $T_1$ of the pressure response of the first inner space 5a with respect to the pressure of the external pressure source 100, and that the volume of the second inner space 5b is twice the volume of the first inner space 5a. The volume change by the pressure is negligibly small compared to the entire volume. In this case, assuming the differential pressure with the ambient pressure of the pressure in the external pressure source 100 as $\Delta p_1$, the differential pressure with the ambient pressure of the pressure in the first inner space 5a as $\Delta P_2$, and the differential pressure with the ambient pressure of the pressure in the second inner space 5b as $\Delta p_3$, the relationship thereof is expressed in the block diagram shown in FIG. 14. Here, $V_1$ and $V_2$ are the volumes of the first and the second inner spaces 5a, 5b, respectively, and $T_1$ and $T_2$ are the time constants. Further, "s" is a complex parameter in the Laplace transform equation. It is apparent from FIG. 13 that the frequency response of the first inner space 5a is substantially the same as for "only 5a". Further, it is apparent that the frequency response of the second inner space 5b approaches the response of the first inner space 5a as the frequency lowers. That is, when driven at a high frequency such as $\omega T_1 > 0.5$, the pneumatic actuator excelling in response that is equivalent to the pneumatic actuator of "only 5a" is obtained. When driven at a low frequency such as $\omega T_1 < 0.01$, the pneumatic actuator 1 excelling in flexibility that is equivalent to the pneumatic actuator of "5a+5b" is obtained since the pressure of the first and the second inner spaces 5a, 5b is substantially the same.

In the first embodiment, a plurality of inner spaces are connected in series, but the present invention also encompasses a case in which a part of the divided inner space is connected in parallel.

(Second Embodiment)

Figure 2:
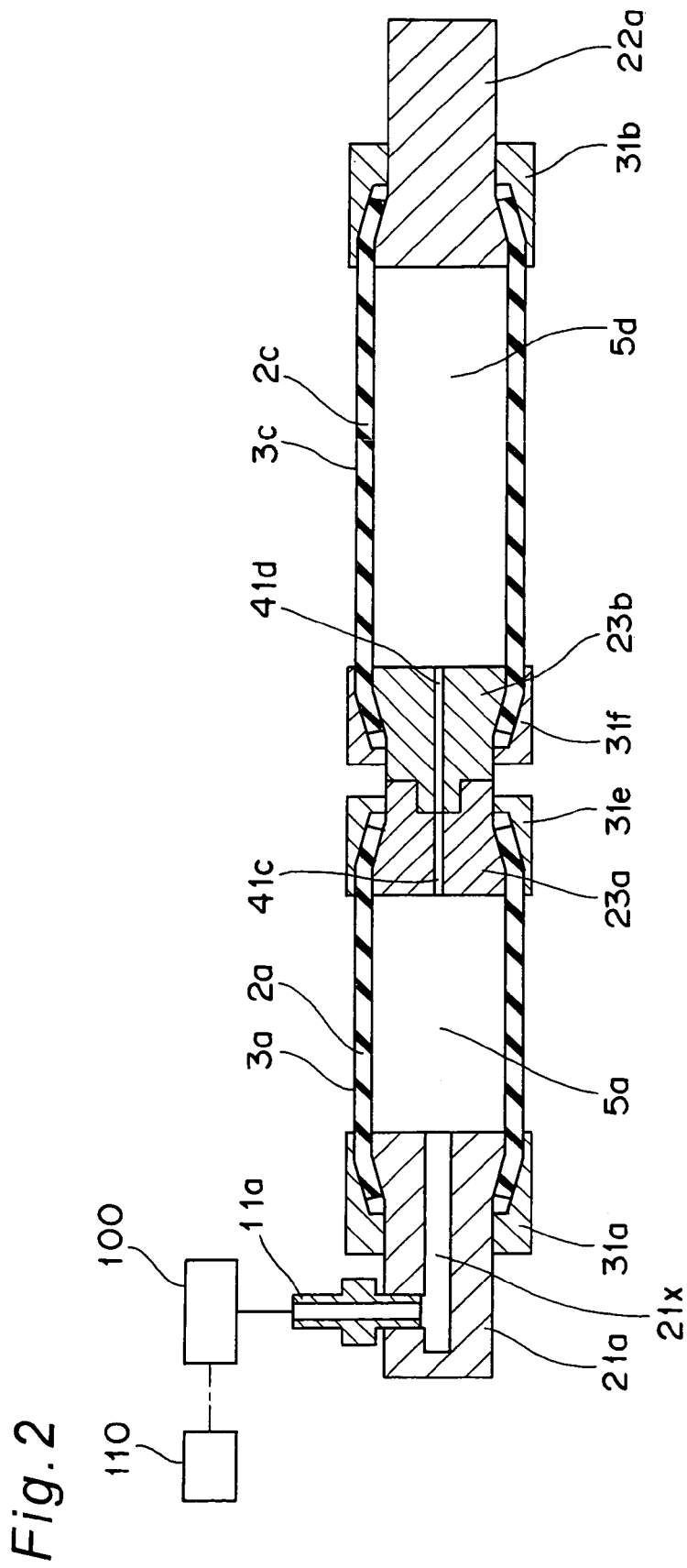
FIG. 2 is a cross sectional view showing an outline of a pneumatic actuator according to a second embodiment of the present invention.

FIG. 2 is a cross sectional view showing the outline of a second embodiment of the pneumatic actuator according to the present invention. The portions functioning similar to the first embodiment described above are denoted with the same reference characters and redundant explanation is omitted. In the second embodiment, both ends of the first tube-like elastic body 2a are sealed with the inner side sealing parts 21a, 23a serving as one example of sealing means and the outer side sealing parts 31a, 31e serving as one example of the fixed means with respect to the pneumatic actuator including the first tube-like elastic body 2a. Both ends of the second tube-like elastic body 2c serving as one example of the second tubular expandable member, which exterior surface is covered by the deforming direction regulating member 3c similar to the deforming direction regulating member 3a, are sealed with the inner side sealing parts 22a, 23*b* serving as one example of the sealing means and the outer side sealing parts 31*b*, 31*f* serving as one example of the fixed means. The convex part on the end face of the inner side sealing part 23*b* of the second tube-like elastic body 2*c* is fitted into and fixed to the concave part on the end face of the inner side sealing part 23*a* of the first tube-like elastic body 2*a* to be connected in series. The second tube-like elastic body 2*c* has an outer diameter and an inner diameter substantially the same as the first tube-like elastic body 2*a*, but the second tube-like elastic body 2*c* is longer than the first tube-like elastic body 2*a*. The fine pores 41*c*, 41*d* serving as one example of the pressure loss part are arranged coaxially and at substantially the center in the inner side sealing parts 23*a*, 23*b* so as to pass through and communicate with each other, whereby the first and the second inner spaces 5*a*, 5*d* are connected through the fine pores 41*c*, 41*d*. The inner diameter of each fine pore 41*c*, 41*d* is substantially the same, and is smaller than the inner diameter of the flow path 21*x*.

The operation of the pneumatic actuator will now be explained. In the pneumatic actuator of the second embodiment of the present invention, when the pressure of the external pressure source 100 is changed by the control of the controlling device 110, the pressure of the second inner space 5*d* changes with a delay with respect to the pressure of the first inner space 5*a*. When the pressure of the external pressure source 100 is rapidly changed by the control of the controlling device 110, the pressure of the second inner space 5*d* barely changes even if the pressure of the first inner space 5*a* approaches the pressure of the external pressure source 100. In this case, the property of the pneumatic actuator becomes substantially the same as the pneumatic actuator having only the first tube-like elastic body 2*a*, and becomes the pneumatic actuator in which the volume of the inner space is small while excelling in response, although the displacement is small. Further, when the pressure of the external pressure source 100 is gradually changed or when static load is applied from the outside or the like, the property substantially the same as when the first and the second inner spaces 5*a*, 5*d* are one inner space is exhibited since the flow rate of the compressible fluid passing through the fine pores 41*c*, 41*d* serving as the pressure loss part is small and the influence of the pressure loss part becomes small. In this case, it acts as the pneumatic actuator that is flexible and has a large displacement.

Figure 3:
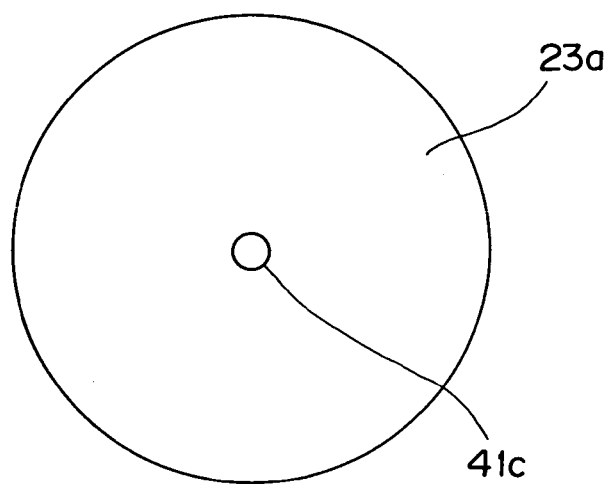
FIG. 3 is a view showing a pressure loss part arranged at a sealing means in the pneumatic actuator according to the second embodiment of the present invention.
Figure 4:
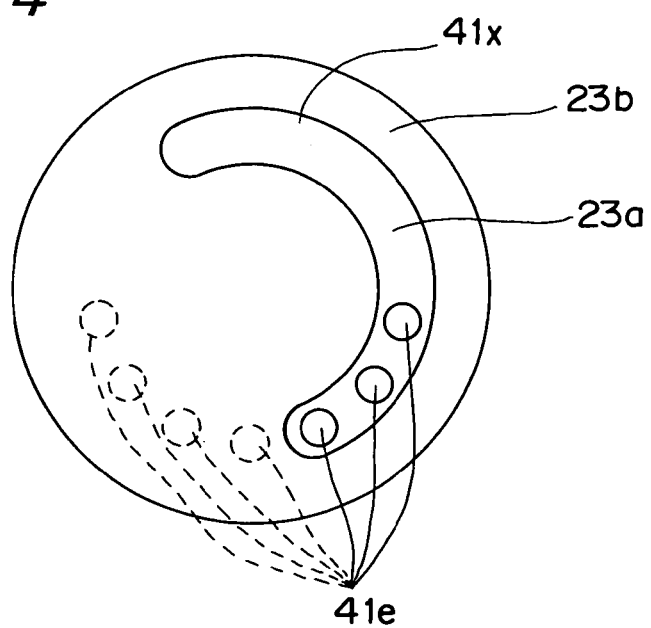
FIG. 4 is a view in which the effect of the pressure loss part arranged at the sealing means is varied in the pneumatic actuator according to the second embodiment of the present invention.

Further, as one example, the pressure loss parts 41*c*, 41*d* arranged on the inner side sealing parts 23*a*, 23*b* are fine pores in FIG. 2, and the central portion of the side view of the inner side sealing part 23*a* is configured as shown in FIG. 3. In this case, the property of the pneumatic actuator defined by the processing precision cannot be changed, but the effect of the pressure loss part can be changed by arranging a plurality of fine pores 41*e*, . . . , 41*e* serving as another example of the pressure loss part instead of one fine pore 41*c* on the inner side sealing part 23*a* as shown in FIG. 4, by opening a circular arc shaped hole 41*x* extending to a range communicatable with all the plural fine pores 41*e*, . . . , 41*e* on the inner side sealing part 23*b*, and by relatively rotating the inner side sealing part 23*a* and the inner side sealing part 23*b* (or first tube-like elastic body 2*a* and the second tube-like elastic body 2*c*) so as to change the angle for overlapping the plural fine pores 41*e* and the circular arc shaped hole 41*x*. The property of the pneumatic actuator can be freely changed in this manner. That is, since the pressure loss part is configured so that the amount of pressure loss at the pressure loss part is adjustable from the outside, the pneumatic actuator in which the balance between the response and the flexibility is adjustable can be obtained. Here, a method of changing the property by changing the number of a plurality of fine pores 41*e* serving as one example of the effective pressure loss part is shown, but a method of changing the property by changing the cross sectional area of the pressure loss part or changing the shape may be used, or the combination thereof may be used.

According to the second embodiment, as mentioned above, by arranging the first inner space 5*a* connected to the external pressure source 100 and the second inner space 5*d* connected to the first inner space 5*a* by way of one or more pressure loss parts 41*c*, 41*d* with respect to the flow of the compressible fluid and being independent of the pressure of the first inner space 5*a* (i.e., volume does not change by the pressure of the first inner space 5*a*) in series, the effects similar to when the volume occupied by the compressible fluid with respect to the entire inner space is reduced are obtained even if the volume of the inner space is not actually changed when the pressure of the external pressure source 100 is rapidly changed, and the effects similar to when the entire inner space is one space are obtained when static load is applied from the outside, and thus the pneumatic actuator exhibiting the property similar to the pneumatic actuator in which the displacement with respect to the movement of high acceleration is small while excelling in response, and similar to the pneumatic actuator in which the displacement with respect to the movement of low acceleration is large while excelling in flexibility can be obtained. Further, when compared to the first embodiment, a more precise displacement control can be performed since the displacement with respect to the movement of high acceleration becomes small.

A case in which the first and the second tube-like elastic bodies 2*a*, 2*c* are used is explained in the second embodiment, but is not limited to two, and the effect can be exhibited as long as two or more bodies are used. Further, the tube-like elastic bodies 2*a*, 2*c* are connected in series in the second embodiment, but the present invention also encompasses a case of connecting a part of the tube-like elastic body in parallel.

Figure 15:
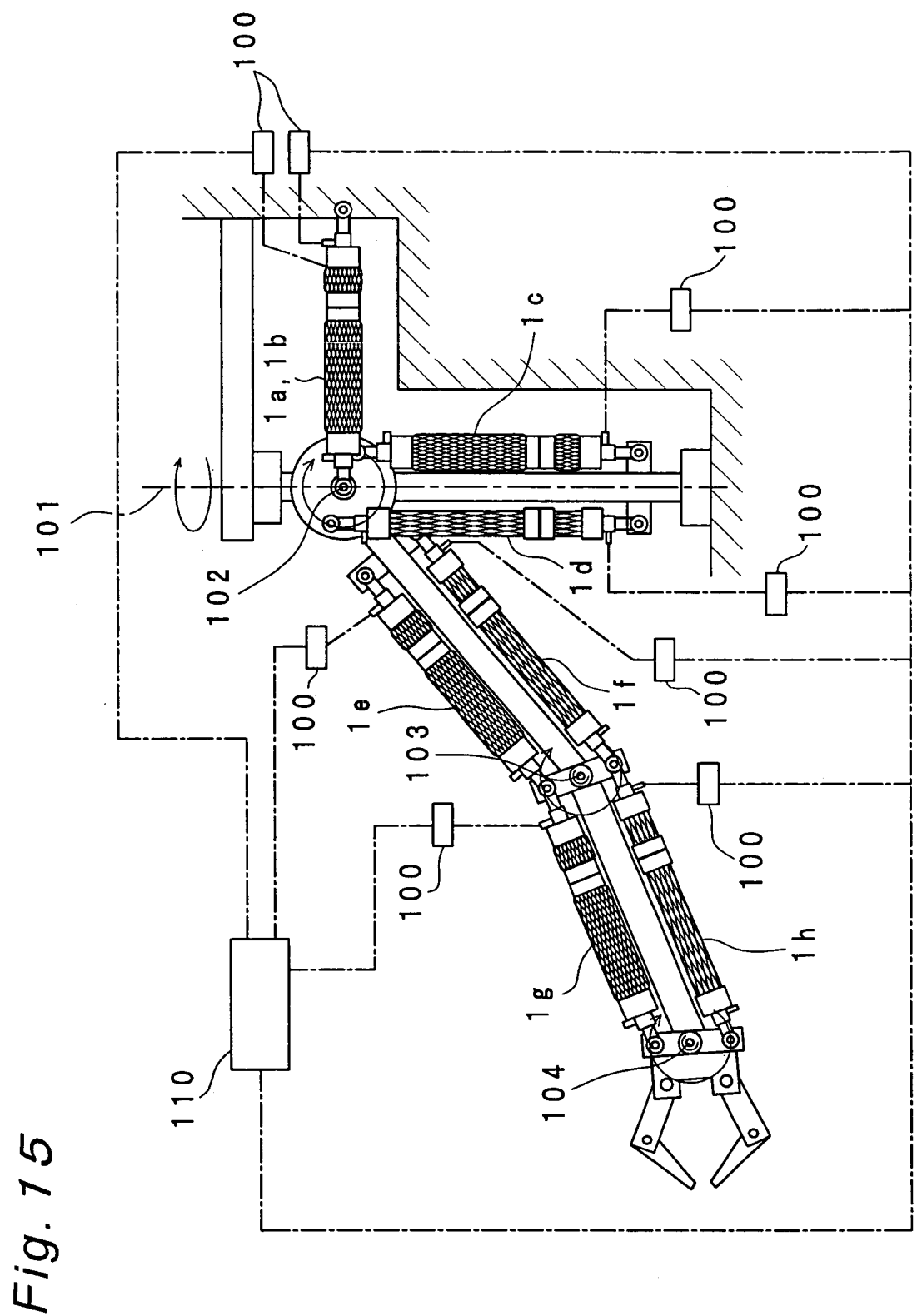
FIG. 15 is a schematic view of a robot hand using the pneumatic actuator according to the second embodiment of the present invention.

A configuration example of a robot hand using the pneumatic actuator according to the second embodiment is shown in FIG. 15. The pneumatic actuators 1*a* to 1*h* corresponding to the pneumatic actuator in the second embodiment are made into pairs to form an antagonistic muscle structure. The external pressure source 100 is connected to each of a pair of pneumatic actuators, which pressure of each external pressure source 100 is controllable by the controlling device 110. The rotational movement can be produced at the shaft positioned between the pair of pneumatic actuators by controlling each external pressure source 100 by the controlling device 110 so that one of the pair of pneumatic actuators is depressurized and the other pneumatic actuator is pressurized. In the configuration of FIG. 15, the shaft 101 is rotated by the pair of pneumatic actuators 1*a*, 1*b*, and similarly, the shaft 102 is rotated by the pair of pneumatic actuator 1*c*, 1*d*, the shaft 103 is rotated by the pair of pneumatic actuators 1*e*, 1*f*, and the shaft 104 is rotated by the pair of pneumatic actuators 1*g*, 1*h*. According to such configuration, the robot hand can be obtained that exhibits the property excelling in controllability when moving the hand at high acceleration, and that exhibits the property of flexibility when external force of low acceleration is applied as the hand contacts the human body and the like. Thus, the robot hand especially suited for household application can be realized. In FIG. 15, the configuration example of the robot hand using the pneumatic actuator of the second embodiment is shown, but is not limited thereto, and the pneumatic actuator in other embodiments may be appropriately used in place of the pneumatic actuator of the second embodiment, thereby configuring the robot hand that has the effect inherent to the respective embodiment.

(Third Embodiment)

Figure 5:
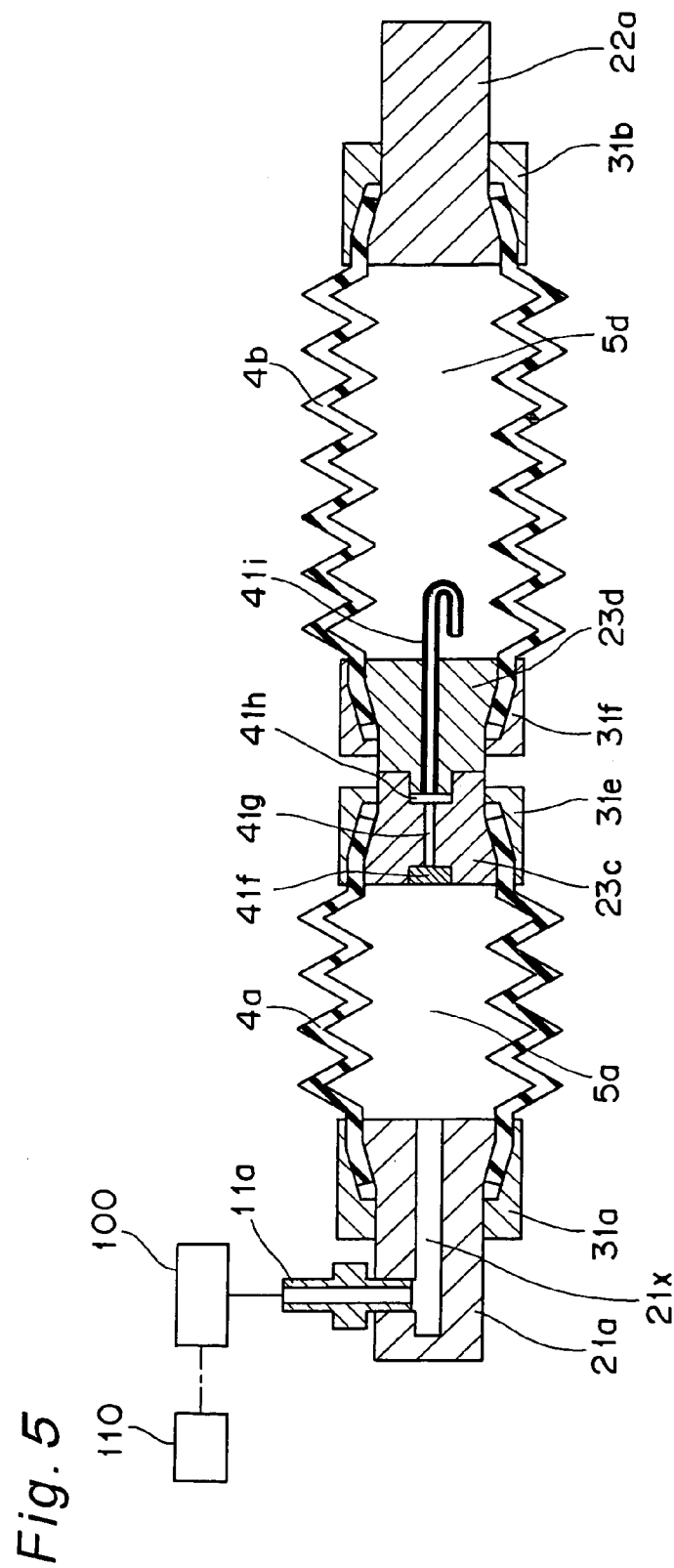
FIG. 5 is a cross sectional view showing an outline of a pneumatic actuator according to a third embodiment of the present invention.

FIG. 5 is a cross sectional view showing an outline of a third embodiment of the pneumatic actuator according to the present invention. The portions functioning similar to the second embodiment described above are denoted with the same reference characters and redundant explanation is omitted. In third embodiment, the first and second bellows shaped elastic bodies $4a$, $4b$ are used in place of the first and the second tube-like elastic bodies $2a$, $2c$ in the second embodiment. The entire length of the tube-like elastic body becomes short as the inner pressure increases, whereas the entire length of the first and second bellows shaped elastic bodies $4a$, $4b$ becomes long as the inner pressure increases. However, since the pneumatic actuator using the first and second bellows shaped elastic bodies $4a$, $4b$ similarly exhibits the response of substantially primary delay system, no significant difference exists in the effect of arranging the pressure loss part. Thus, the present invention is applicable irrespective of the method of the pneumatic actuator. For instance, that combining an impact mechanism such as a spring to the pneumatic cylinder is also usable. They are not limited to the third embodiment, and may be applicable to other embodiments.

In the third embodiment, a porous plate $41f$ made of porous material, a fine pore $41g$, a wide-width conduit $41h$ formed by the sudden change in the cross sectional area of the conduit, and a narrow tube $41i$ including the bent part are combined as the pressure loss part. The porous plate $41f$ and the fine pore $41g$ function as one example of the sealing means, and is arranged in the inner side sealing part $23c$ corresponding to the inner side sealing part $23a$, whereas the wide-width conduit $41h$ and the narrow tube $41i$ function as one example of the sealing means and is arranged in the inner side sealing part $23d$ corresponding to the inner side sealing part $23b$. The inner diameter of each of the fine pore $41g$ and the narrow tube $41i$ are substantially the same and are smaller than the inner diameter of the flow path $21x$. Thus, in the present invention, various forms may be used as the pressure loss part, and the present invention encompasses cases of arbitrary combining the various forms as the pressure loss part. These pressure loss parts are also applicable to other embodiments.

(Fourth Embodiment)

Figure 6:
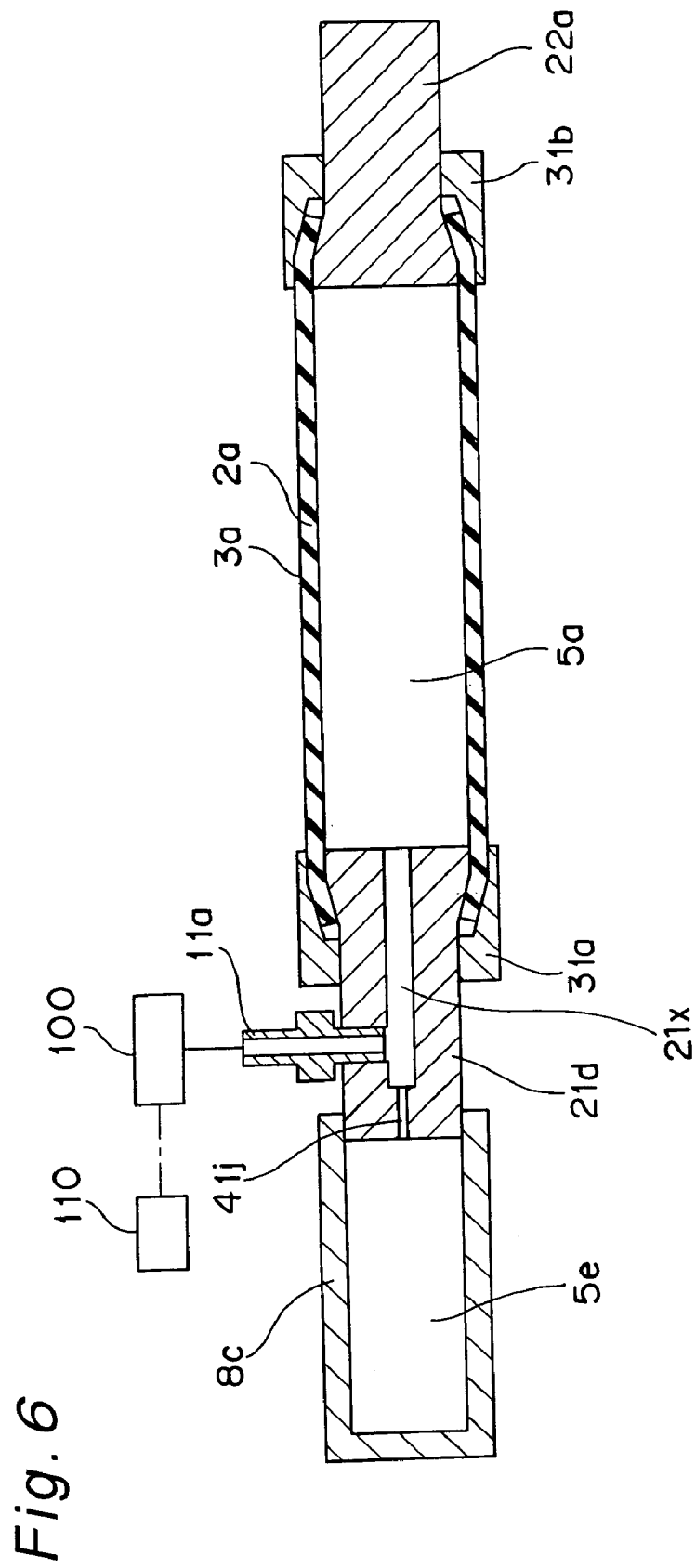
FIG. 6 is a cross sectional view showing an outline of a pneumatic actuator according to a fourth embodiment of the present invention.

FIG. 6 is a cross sectional view showing an outline of a fourth embodiment of the pneumatic actuator according to the present invention. The portions functioning similar to the first embodiment described above are denoted with the same reference characters and redundant explanation is omitted. In the fourth embodiment, an inner space $5e$ defined by a cover $8c$ is arranged exterior to the pneumatic actuator, and is connected to the conduit in the inner side sealing part $21d$ serving as one example of the sealing means similar to the inner side sealing part $21a$ by way of the fine pore $41j$ serving as one example of the pressure loss part. Further, the inner diameter of the fine pore $41j$ is smaller than the inner diameter of the flow path $21x$. The cover $8c$ is a cylindrical cover serving as one example of a tubular member arranged coaxially with the first tube-like elastic body $2a$, and preferably formed as a rigid body having a rigidity of an extent that does not expand by the compressible fluid such as air and does not volume-change even from the external pressure, and having an opening at the fixed end side fixed to the inner side sealing part $21d$ and a bottom on the free end side.

In the configuration of the fourth embodiment, it is the same as the conventional pneumatic actuator with respect to the movement of high acceleration, but exhibits the property similar to when the entire inner space is increased by the amount of the inner space $5e$ with respect to the movement of low acceleration. That is, according to the fourth embodiment, one or more space connected to the flow path $21x$, which connects the pressure source $100$ and the inner space $5a$, by way of one or more pressure loss part $41j$ with respect to the flow of the compressible fluid and being independent of the pressure of the inner space $5e$ (i.e., volume does not change by the pressure of the inner space $5e$) is arranged, and thus the pneumatic actuator having more enhanced flexibility with respect to the movement of low acceleration can be obtained.

Only one inner space is added in the fourth embodiment, but similar effect is obtained even when two or more spaces are added. The present invention also encompasses such case.

(Fifth Embodiment)

Figure 7:
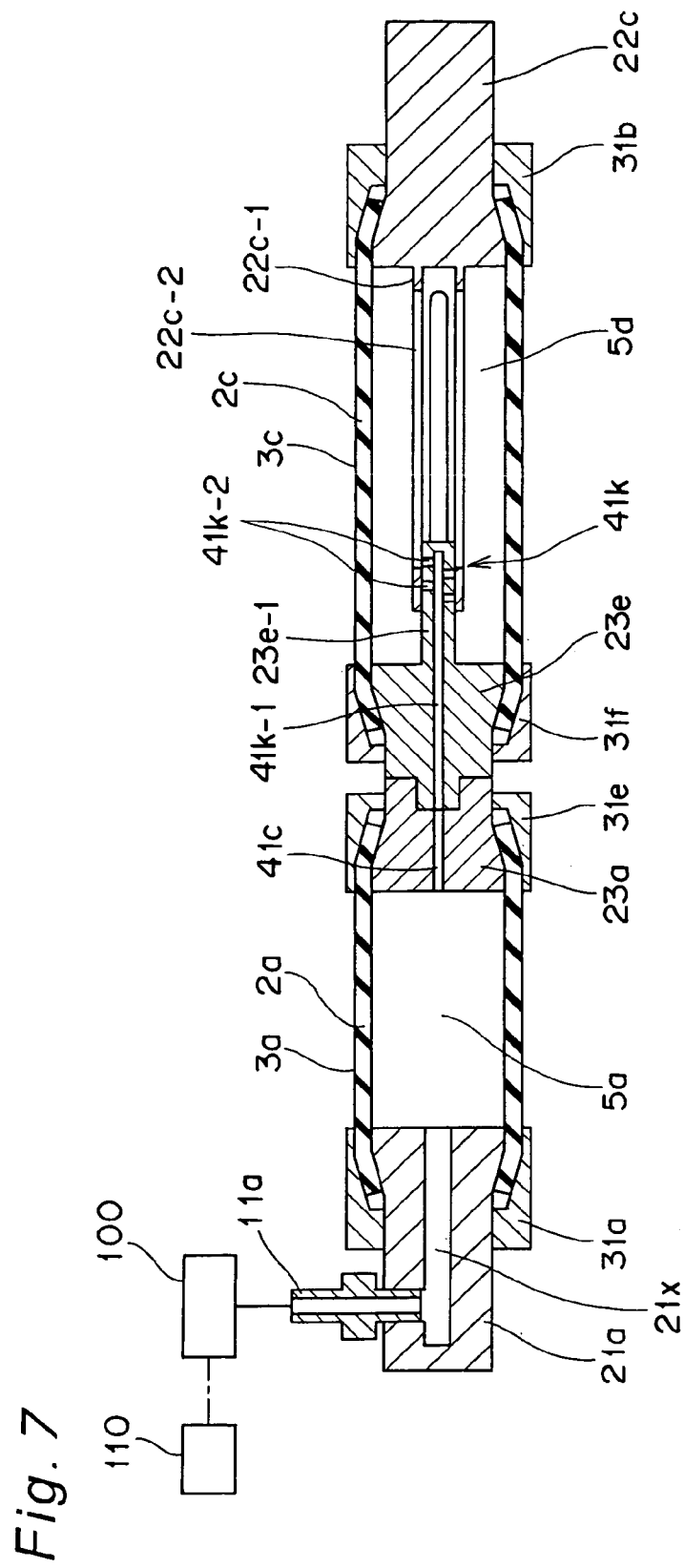
FIG. 7 is a cross sectional view showing an outline of a pneumatic actuator according to a fifth embodiment of the present invention.

FIG. 7 is a cross sectional view showing an outline of a fifth embodiment of the pneumatic actuator according to the present invention. The portions functioning similar to the second embodiment described above are denoted with the same reference characters and redundant explanation is omitted. A large number of pass-through holes $41k$-$2$, ..., $41k$-$2$ of the pressure loss mechanism $41k$ functioning as an example of the pressure loss part arranged in the inner side sealing part $23e$ functioning as one example of the sealing means is partially covered by the inner side sealing part $22c$ in the fifth embodiment.

More specifically, in FIG. 7, a first cylindrical projection $23e$-$1$ including a conduit $41k$-$1$ in the inside is arranged at the central part on the right end of the inner side sealing part $23e$, and a large number of pass-through holes $41k$-$2$, ..., $41k$-$2$ communicating with the conduit $41k$-$1$ and passed through in the radial direction are formed at the distal end of the first cylindrical projection $23e$-$1$. A second cylindrical projection $22c$-$1$ serving as one example of a blocking member is arranged at the central part on the left end of the inner side sealing part $22c$, the second cylindrical projection $22c$-$1$ being slidably moved and capable of being fitted to the outer surface of the first cylindrical projection $23e$-$1$ and including a plurality of long hole openings $22c$-$2$, ..., $22c$-$2$ that can open and close the large number of pass-through holes $41k$-$2$, $41k$-$2$. The inner diameter of the fine pore $41c$, the conduit $41k$-$1$, and each pass-through hole $41k$-$2$ is substantially the same, and is smaller than the inner diameter of the flow path $21x$. In the initial state of the second tube-like elastic body $2c$, most of the large number of pass-through holes $41k$-$2$, ..., $41k$-$2$ of the first cylindrical projection $23e$-$1$ excluding only one part of the pass-through hole(s) $41k$-$2$ are blocked at the portion where the long hole openings $22c$-$2$, ..., $22c$-$2$ of the second tube-like elastic body $2c$ do not exist. When the pressure of the external pressure source $100$ is rapidly changed by the control of the controlling device $110$, the pressure of the second inner space $5d$ barely changes even if the pressure of the first inner space $5a$ approaches the pressure of the external pressure source $100$. In this case, the property of the pneumatic actuator is substantially the same as the pneumatic actuator including only the first tube-like elastic body $2a$, and becomes the pneumatic actuator in which the volume of the inner space is small while excelling in response, although the displacement is small. When the pressure of the external pressure source 100 is gradually changed or when the static load is applied from the outside or the like, the property similar to when the first and the second inner space 5a, 5d is one inner space is exhibited since the flow rate of the compressible fluid passing through the fine pore 41c and the conduit 41k-1 serving as the pressure loss part is small, and the influence on the pressure loss part is reduced. In the configuration of the fifth embodiment, when the entire length of the pneumatic actuator becomes short, in other words the length of the second tube-like elastic body 2c becomes short as the pressure of the second inner space 5d increases, the portion where the second cylindrical projection 22c-1 and the first cylindrical projection 23e-1 slidably move and overlap each other increases, the portion where the large number of pass-through holes 41k-2, . . . , 41k-2 of the first cylindrical projection 23e-1 and the plurality of long hole openings 22c-2, . . . , 22c-2 of the second cylindrical projection 22c-1 face each other thereby opening the large number of pass-through holes 41k-2, 41k-2 increases, and the covering with respect to the large number of pass-through holes 41k-2 decreases. That is, the pressure loss by the pressure loss part changes according to the displacement of the pneumatic actuator. When the pressure loss changes, the flow rate with respect to the same pressure difference is changed, and thus the time response property of the pressure of the second inner space 5d is changed. The time response property of the pressure can thus be adjusted to a certain extent by changing the pressure loss through displacement.

In the fifth embodiment, a configuration in which the pressure loss decreases as the entire length of the pneumatic actuator becomes shorter is provided, but can be freely changed as necessary. The present invention encompasses all cases.

(Sixth Embodiment)

Figure 8:
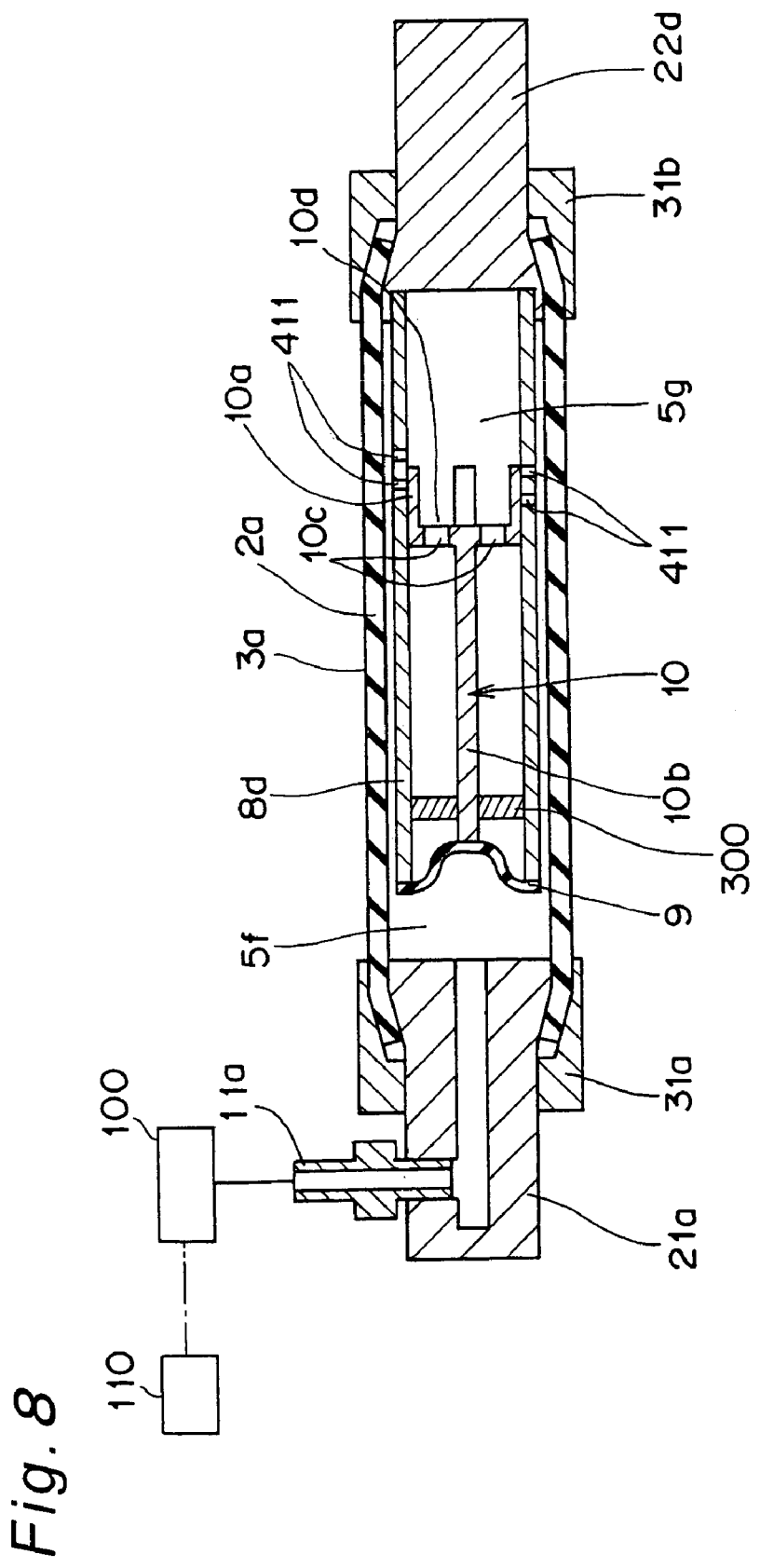
FIG. 8 is a cross sectional view showing an outline of a pneumatic actuator according to a sixth embodiment of the present invention.

FIG. 8 is a cross sectional view showing an outline of a sixth embodiment of the pneumatic actuator according to the present invention. The portions functioning similar to the first embodiment described above are denoted with the same reference characters and redundant explanation is omitted. In the sixth embodiment, a plurality of fine pores 411 serving as one example of the pressure loss formed in the cover 8d is partially covered by a barrel part 10a of the slide rod 10. The cover 8d is a cylindrical cover serving as one example of a tubular member arranged coaxially with the first tube-like elastic body 2a, and preferably formed as a rigid body having rigidity to an extent it does not expand by the compressible fluid such as air and the like and does not volume-change by the pressure of the inner space 5f, and including an opening on the fixed end side fixed to the inner sealing part 22d serving as one example of the sealing means and fixedly arranged with an elastic body 9 such as rubber film at the opening on the free end side. The slide rod 10 slidable with respect to the inner peripheral surface of the cover 8d is substantially configured by a shaft part 10b positioned at the center, the barrel part 10a arranged in the vicinity of the end of the shaft part 10b and slidably guided by the inner peripheral surface of the cover 8d, and a flange 10d for coupling the shaft part 10b and the barrel part 10a and including pass-through ports 10c. The distal end of the shaft part 10b of the slide rod 10 is connected to the central part of the elastic body 9. Further, a partitioning plate 300 of a disc shaped rigid body through which the shaft part 10b is slidably passed through is fixed in the vicinity of the elastic body 9 of the cover 8d, so that the volume of the space (i.e., volume of a fourth inner space 5g) flowing from the fine pores 411, . . . , 411 into the cover 8d is defined by the partitioning plate 300 and the cover 8d irrespective of the fluctuation of the elastic body 9, and thus the response is enhanced by unchanging the volume of the fourth inner space 5g. Thus, the covering for the plurality of fine pores 411, . . . , 411 each having an inner diameter smaller than the inner diameter of the flow path 21x is adapted to be varied by the pressure difference between the third inner space 5f formed between the inner surface of the first tube-like elastic body 2a, the outer surfaces of the cover 8d and the elastic body 9, and the fourth inner space 5g formed between the inner surfaces of the cover 8d and the partitioning plate 300. That is, the pressure loss by the pressure loss part changes according to the pressure of the pneumatic actuator. When the pressure loss changes, the flow rate with respect to the same pressure difference is also changed, and thus the time response property of the pressure of the fourth inner space 5g is changed. The time response property of the displacement is thus adjustable to a certain extent by changing the pressure loss by the pressure of the inner space. The inner side sealing part 22d corresponds to the inner side sealing part 22b of the pneumatic actuator of the first embodiment.

In the sixth embodiment, the configuration in which the pressure loss decreases as the pressure difference of the pneumatic actuator becomes smaller is provided, but can be freely changed as necessary. The present invention encompasses all cases.

Figure 16:
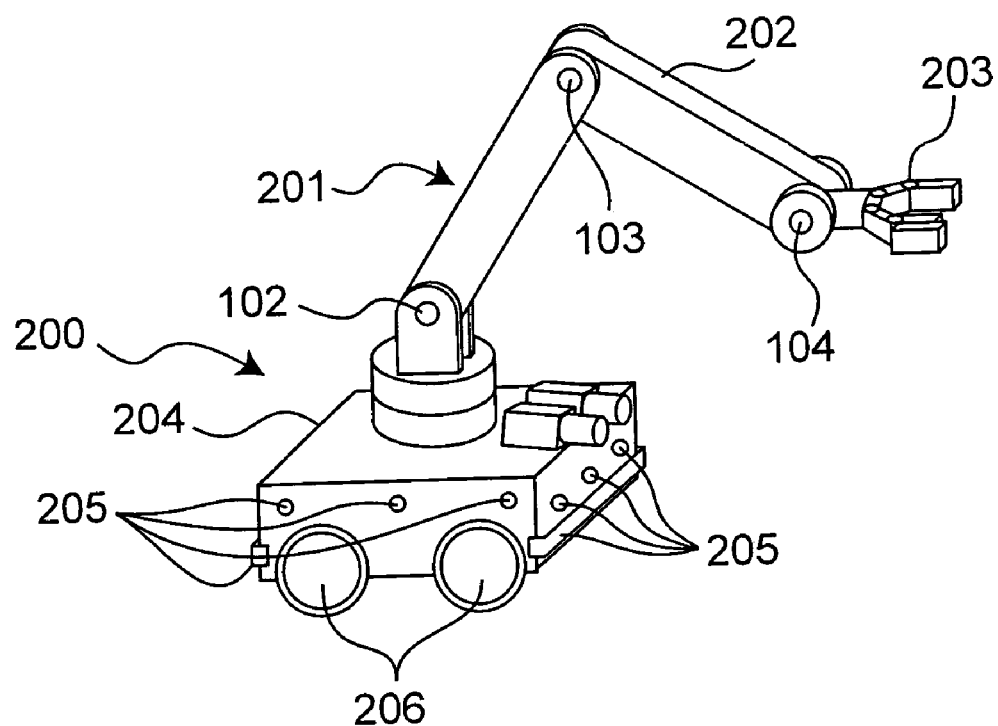
FIG. 16 is a schematic view of a self-propelling robot in which the robot hand using the pneumatic actuator according to the embodiment of the present invention is assembled onto a movable truck.

A case of applying the robot hand using the pneumatic actuator according to any one of the above embodiments of the present invention and suitable for household application to a self-propelling robot assembled to a traveling vehicle will now be explained. As shown in FIG. 16, the self-propelling robot 200 includes four traveling wheels 206 coupled to a driving device such as a driving motor controllable by the control of the controlling device 110 on a moving truck 204, and includes cameras or sensors 205 for detecting humans or objects at the side surfaces of the moving truck 204. The portion from the shaft 101 to the hand 203 at the distal end of the arm of FIG. 15 is attached to the upper surface of the moving truck 204, where a pair of pneumatic actuators 1e, 1f are arranged in the second arm 201, and a pair of pneumatic actuators 1g, 1h are arranged in the first arm 202. According to this configuration, the moving truck 204 is moved and a desired operation is performed by appropriately using the first arm 202, the second arm 201, and the hand 203, under the control of the controlling device 110, while the environment around the moving truck 204 is detected by the cameras or the sensors 205, and further, the presence of humans or objects around the moving truck 204 can be detected and utilized for the control of the desired operation. Therefore, it can be appropriately switched between two modes of slowly operating the first arm 202, the second arm 201, the hand 203, and the moving truck 204 to ensure safety if human is near the self-propelling robot 200 (when human enter a room where the self-propelling robot 200 exists), and rapidly and crisply operating the first arm 202, the second arm 201, the hand 203, and the moving truck 204 if human is not near the self-propelling robot 200. More specifically, a robot suited for household application can be realized that can be switched between two modes wherein it is rapidly operated when folding the laundry at a position distant from humans and slowly operated when handing the folded laundry over to humans, and that enhances response while maintaining flexibility.

The present invention is not limited to the first to the sixth embodiments, and various modifications are possible based on the subject of the present invention, which are all encompassed in the present invention. For instance, by appropriately combining an arbitrary embodiment out of various embodiments described above, the respective effect can be exhibited.

The compressible fluid pressure actuator according to the present invention is a compressible fluid pressure actuator that can enhance response with respect to the movement of high acceleration where response is required, and that can maintain flexibility with respect to the movement of low acceleration where safety is important; and is useful as pneumatic actuator and the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A compressible fluid pressure actuator in which a pressure in a space defined inside is changed by a pressure of a compressible fluid supplied from a pressure source to generate displacement or force accordingly, the compressible fluid pressure actuator comprising:
   a first tubular expandable member including a first inner space connected to the pressure source; and
   tubular members including one or more inner spaces connected to the first inner space by way of two or more pressure loss parts with respect to flow of the compressible fluid and each having a volume that does not depend on a pressure of a first inner space,
   wherein the tubular members include a first tubular member including a second inner space formed in the first tubular member and connected to the first inner space of the first tubular expandable member by way of the pressure loss part and having a volume that does not depend on the pressure of the first inner space; and a second tubular member arranged coaxially within the first tubular member including a third inner space and formed in the second tubular member and connected to the second inner space by way of another pressure loss part and having a volume that does not depend on a pressure of the second inner space.

2. The compressible fluid pressure actuator as defined in claim 1, wherein the pressure loss part is a fine pore for connecting the inner spaces.

3. A compressible fluid pressure actuator in which the compressible fluid pressure actuator as defined in claim 1 is provided in a plural quantity to be connected by connecting the inner spaces of the adjacent actuators by way of at least one of the pressure loss parts with respect to the flow of the compressible fluid.

4. A compressible fluid pressure actuator in which a pressure in a space defined inside is changed by a pressure of a compressible fluid supplied from a pressure source to generate displacement or force accordingly, the compressible fluid pressure actuator comprising:
   a first tubular expandable member including a first inner space connected to the pressure source; and
   tubular members including one or more inner spaces connected to the first inner space by way of two or more pressure loss parts with respect to flow of the compressible fluid and each having a volume that does not depend on a pressure of the first inner space,
   wherein the pressure loss parts are configured so that a pressure loss is always larger on the pressure loss part at a downstream side than the pressure loss part on an upstream side with respect to the pressure source when compared at the pressure loss for the same flow rate.

5. A compressible fluid pressure actuator in which a pressure in a space defined inside is changed by a pressure of a compressible fluid supplied from a pressure source to generate displacement or force accordingly, the compressible fluid pressure actuator comprising:
   a first tubular expandable member including a first inner space connected to the pressure source;
   a second tubular expandable member including a second inner space connected to the pressure source by way of the first tubular expandable member and having a volume that does not depend on a pressure of the first inner space; and
   at least one pressure loss part with respect to flow of the compressible fluid, for connecting the first inner space and the second inner space,
   wherein the pressure loss part is configured so that a pressure loss at the pressure loss part changes according to a displacement of the compressible fluid pressure actuator.

6. A robot including a robot arm having a compressible fluid pressure actuator in which a pressure in a space defined inside is changed by a pressure of a compressible fluid supplied from a pressure source to generate displacement or force accordingly, the compressible fluid pressure actuator comprising:
   a first tubular expandable member including a first inner space connected to the pressure source; and
   tubular members including one or more inner spaces connected to the first inner space by way of two or more pressure loss parts with respect to flow of the compressible fluid and each having a volume that does not depend on a pressure of a first inner space,
   wherein the tubular members include a first tubular member including a second inner space formed in the first tubular member and connected to the first inner space of the first tubular expandable member by way of the pressure loss part and having a volume that does not depend on the pressure of the first inner space; and a second tubular member arranged coaxially within the first tubular member including a third inner space and formed in the second tubular member and connected to the second inner space by way of another pressure loss part and having a volume that does not depend on a pressure of the second inner space.

7. A compressible fluid pressure actuator in which a pressure in a space defined inside is changed by a pressure of a compressible fluid supplied from a pressure source to generate displacement or force accordingly, the compressible fluid pressure actuator comprising:
   a first tubular expandable member including a first inner space connected to the pressure source;
   a second tubular expandable member including a second inner space connected to the pressure source by way of the first tubular expandable member and having a volume that does not depend on a pressure of the first inner space; and
   two or more pressure loss parts with respect to flow of the compressible fluid, for connecting the first inner space and the second inner space,
   wherein the pressure loss parts are configured so that a pressure loss is always larger at the pressure loss part on a downstream side than the pressure loss part on an upstream side with respect to the pressure source when compared at the pressure loss for the same flow rate.

8. A compressible fluid pressure actuator in which a pressure in a space defined inside is changed by a pressure of a compressible fluid supplied from a pressure source to generate displacement or force accordingly, the compressible fluid pressure actuator comprising:
- a first tubular expandable member including a first inner space connected to the pressure source;
- a second tubular expandable member including a second inner space connected to the pressure source by way of the first tubular expandable member and having a volume that does not depend on a pressure of the first inner space; and
- at least one pressure loss part with respect to flow of the compressible fluid, for connecting the first inner space and the second inner space, wherein an amount of pressure loss at the pressure loss part is adjustable from an outside.

9. A compressible fluid pressure actuator in which a pressure in a space defined inside is changed by a pressure of a compressible fluid supplied from a pressure source to generate displacement or force accordingly, the compressible fluid pressure actuator comprising:
- a first tubular expandable member including a first inner space connected to the pressure source; and
- a tubular member including an inner space connected to the first inner space by way of one pressure loss part with respect to flow of the compressible fluid and having a volume that does not depend on a pressure of the first inner space.

* * * * *